(12) United States Patent
Wang et al.

(10) Patent No.: US 12,424,182 B1
(45) Date of Patent: Sep. 23, 2025

(54) DISPLAY PANEL

(71) Applicant: AUO Corporation, Hsinchu (TW)

(72) Inventors: Jia-Hong Wang, Hsinchu (TW); Ya-Ling Hsu, Hsinchu (TW); Chen-Hsien Liao, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/946,874

(22) Filed: Nov. 13, 2024

(30) Foreign Application Priority Data

May 2, 2024 (TW) .................................. 113116411

(51) Int. Cl.
*G09G 3/32* (2016.01)
*G02F 1/1333* (2006.01)
*G09G 3/36* (2006.01)

(52) U.S. Cl.
CPC ..... *G09G 3/3607* (2013.01); *G02F 1/133308* (2013.01); *G09G 3/32* (2013.01); *G09G 2310/08* (2013.01); *G09G 2320/0233* (2013.01); *G09G 2320/0247* (2013.01)

(58) Field of Classification Search
CPC ......... G09G 3/30–3291; G09G 3/3607; G09G 2310/08; G09G 2320/0233; G09G 2320/0247
See application file for complete search history.

(56) References Cited

U.S. PATENT DOCUMENTS

| | | | | |
|---|---|---|---|---|
| 8,354,992 B2 * | 1/2013 | Rumreich | ............ | G09G 3/3648 349/64 |
| 9,583,046 B2 * | 2/2017 | Shimizu | ............... | G02B 6/0043 |
| 10,614,283 B2 * | 4/2020 | He | .......................... | G06F 21/32 |
| 11,450,297 B1 * | 9/2022 | Sprague | ................... | G09G 3/32 |
| 11,561,403 B2 | 1/2023 | Zhou | | |
| 11,774,766 B2 | 10/2023 | Zhou | | |
| 12,038,588 B2 | 7/2024 | Zhou | | |
| 12,254,816 B2 * | 3/2025 | Halbritter | ................ | G09G 3/32 |
| 12,366,403 B2 * | 7/2025 | Jin | ......................... | F25D 23/02 |
| 2022/0076610 A1 | 3/2022 | Pappas et al. | | |
| 2022/0353964 A1 | 11/2022 | Nietfeld | | |
| 2022/0373801 A1 | 11/2022 | Zhou | | |

(Continued)

FOREIGN PATENT DOCUMENTS

| | | |
|---|---|---|
| CN | 113557796 | 10/2021 |
| CN | 114501726 | 5/2022 |

(Continued)

*Primary Examiner* — Gene W Lee
(74) *Attorney, Agent, or Firm* — JCIPRNET

(57) ABSTRACT

A display panel is provided. The display panel includes multiple liquid crystal pixel circuits and multiple self-luminous pixel circuits. The liquid crystal pixel circuit is disposed in a main display area of the display panel. Each of the self-luminous pixel circuits has multiple light-emitting elements and is disposed in a bezel display area surrounding the main display area in the display panel. Each of the self-luminous pixel circuits receives multiple display data, determines a pulse wave gradient method of a driving current for driving a corresponding one of the light-emitting elements based on multiple gradient bits of one of the display data, and determines a target current level for climbing of multiple current pulse waves of the driving current based on multiple gray-scale current bits of the one of the display data.

9 Claims, 4 Drawing Sheets

(56) References Cited

U.S. PATENT DOCUMENTS

| | | | |
|---|---|---|---|
| 2023/0092321 A1* | 3/2023 | Halbritter | G09G 3/32 |
| | | | 345/690 |
| 2023/0095998 A1* | 3/2023 | Hashikaki | G09G 3/3258 |
| | | | 345/204 |
| 2023/0110502 A1 | 4/2023 | Zhou | |
| 2023/0368731 A1* | 11/2023 | Toyoda | G09G 3/2096 |
| 2023/0400692 A1 | 12/2023 | Zhou | |
| 2024/0126111 A1 | 4/2024 | Zhou et al. | |

FOREIGN PATENT DOCUMENTS

| | | |
|---|---|---|
| CN | 115458521 | 12/2022 |
| CN | 115578940 | 1/2023 |

* cited by examiner

DISPLAY PANEL

CROSS-REFERENCE TO RELATED APPLICATION

This application claims the priority benefit of Taiwan application serial no. 113116411, filed on May 2, 2024. The entirety of the above-mentioned patent application is hereby incorporated by reference herein and made a part of this specification.

BACKGROUND

Technical Field

The disclosure relates to a display panel, and in particular to a display panel having a liquid crystal pixel circuit and a self-luminous pixel circuit.

Description of Related Art

In recent years, in order to improve viewing experiences of users, narrow bezels have become an important design topic. Moreover, in order to optimize the design of an extremely narrow bezel, in the design of a display panel, a bezel display area is provided with a self-luminous pixel circuit. However, the self-luminous pixel circuit generally drives a self-luminous element through current pulse waves, which is different from a liquid crystal (LC) pixel circuit in a main display area that drives liquid crystal transitions through voltage levels. Therefore, initial emission waveforms of the self-luminous pixel circuit and the liquid crystal pixel circuit are different. In other words, the behavior of the self-luminous element in emitting light is different from the behavior of a liquid crystal element that needs to be charged and thereby rotate. If the initial emission waveforms and timings of the self-luminous pixel circuit and the liquid crystal pixel circuit are not considered, in practical applications, the display panel has issues such as unevenness, flickering, and boundary screen tearing, which are easily detected by human eyes and affect the viewing experiences.

SUMMARY

The disclosure provides a display panel, which controls initial emission waveforms and timings of a self-luminous pixel circuit and a liquid crystal pixel circuit to be similar to reduce issues such as uneven screen, panel flickering, and boundary screen tearing caused by differences between the self-luminous pixel circuit and the liquid crystal pixel circuit.

A display panel of the disclosure includes multiple liquid crystal pixel circuits and multiple self-luminous pixel circuits. The liquid crystal pixel circuit is disposed in a main display area of the display panel. Each of the self-luminous pixel circuits has multiple light-emitting elements and is disposed in a bezel display area surrounding the main display area in the display panel. Each of the self-luminous pixel circuits receives multiple display data, determines a pulse wave gradient method of a driving current for driving a corresponding one of the light-emitting elements based on multiple gradient bits of one of the display data, and determines a target current level for climbing of multiple current pulse waves of the driving current based on multiple gray-scale current bits of the one of the display data.

Based on the above, in the display panel of the embodiment of the disclosure, since the current pulse waves of the driving current of the light-emitting element are set by the gradient method, compared with a traditional pulse wave driving method, a light-emitting method (that is, a brightness curve) of the light-emitting element may approach a brightness curve of the liquid crystal pixel circuit. In this way, the liquid crystal pixel circuit and the self-luminous pixel circuit may be as similar as possible in terms of light pattern performance, chromaticity, brightness, and behavior, thereby achieving an extremely narrow bezel or even bezel-less and a seamless viewing experience.

In order for the features and advantages of the disclosure to be more comprehensible, the following specific embodiments are described in detail in conjunction with the drawings.

DESCRIPTION OF THE EMBODIMENTS

Unless otherwise defined, all terms (including technical and scientific terms) used herein have the same meaning as commonly understood by persons skilled in the art of the disclosure. It will be further understood that terms such as those defined in commonly used dictionaries should be interpreted as having meanings consistent with the meanings in the related art and the context of the disclosure, and will not be interpreted as having idealized or overly formal meanings unless explicitly defined herein.

It should be understood that although terms such as "first", "second", and "third" may be used herein to describe various elements, components, regions, layers, and/or parts, the elements, components, regions, and/or parts are not limited by the terms. The terms are only used to distinguish one element, component, region, layer, or part from another element, component, region, layer, or part. Therefore, a first "element", "component", "region", "layer", or "part" discussed below may be referred to as a second element, component, region, layer, or part without departing from the teachings herein.

The terms used herein are only for the purpose of describing specific embodiments and are not limiting. As used herein, unless the content clearly indicates otherwise, the singular forms "a", "one", and "the" are intended to include plural forms, including "at least one". "Or" represents "and/or". As used herein, the term "and/or" includes any and all combinations of one or more of the relevant listed items. It should also be understood that when used in the specification, the terms "containing" and/or "including" designate the presence of the feature, the region, the entirety, the step, the operation, the element, and/or the component, but do not exclude the presence or the addition of one or more other features, regions, entireties, steps, operations, elements, components, and/or combinations thereof.

Figure 1:
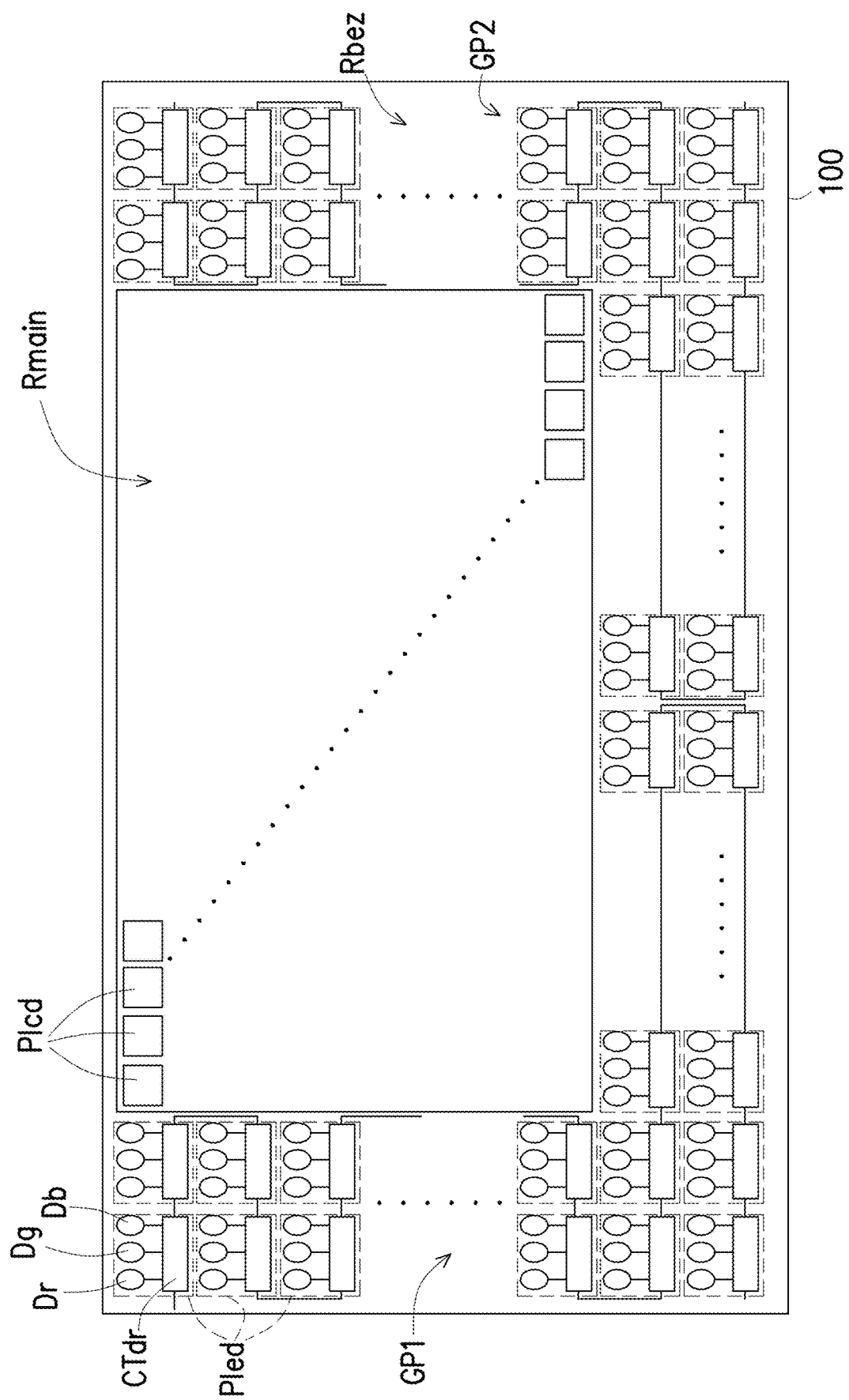
FIG. 1 is a system schematic diagram of a display panel according to an embodiment of the disclosure.
Figure 2:
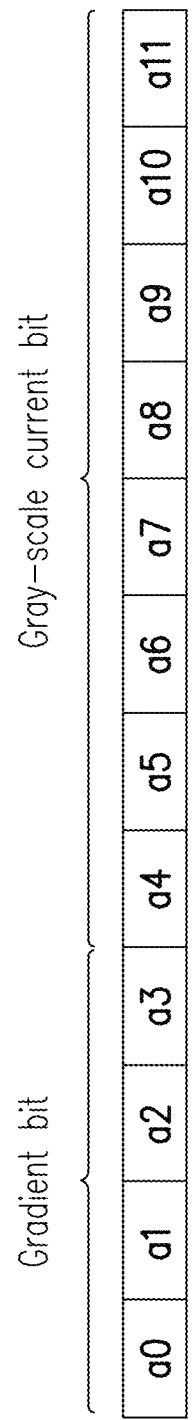
FIG. 2 is a schematic configuration diagram of a display system according to an embodiment of the disclosure.

FIG. 1 is a system schematic diagram of a display panel according to an embodiment of the disclosure. FIG. 2 is a schematic configuration diagram of a display system according to an embodiment of the disclosure. Please refer to FIG. 1 and FIG. 2. In the embodiment, a display panel 100 is mainly divided into a main display area Rmain and a bezel display area Rbez surrounding the main display area Rmain and includes multiple liquid crystal pixel circuits Plcd and multiple self-luminous pixel circuits. Pled.

The liquid crystal pixel circuits Pled of the display panel 100 are disposed in the main display area Rmain and may be arranged in an array, but the embodiment of the disclosure is not limited thereto. Each of the self-luminous pixel circuits Pled of the display panel 100 has multiple light-emitting elements (for example, a red light-emitting diode Dr, a green light-emitting diode Dg, and a blue light-emitting diode Db), and the self-luminous pixel circuits Pled are disposed in the bezel display area Rbez.

Figure 3:
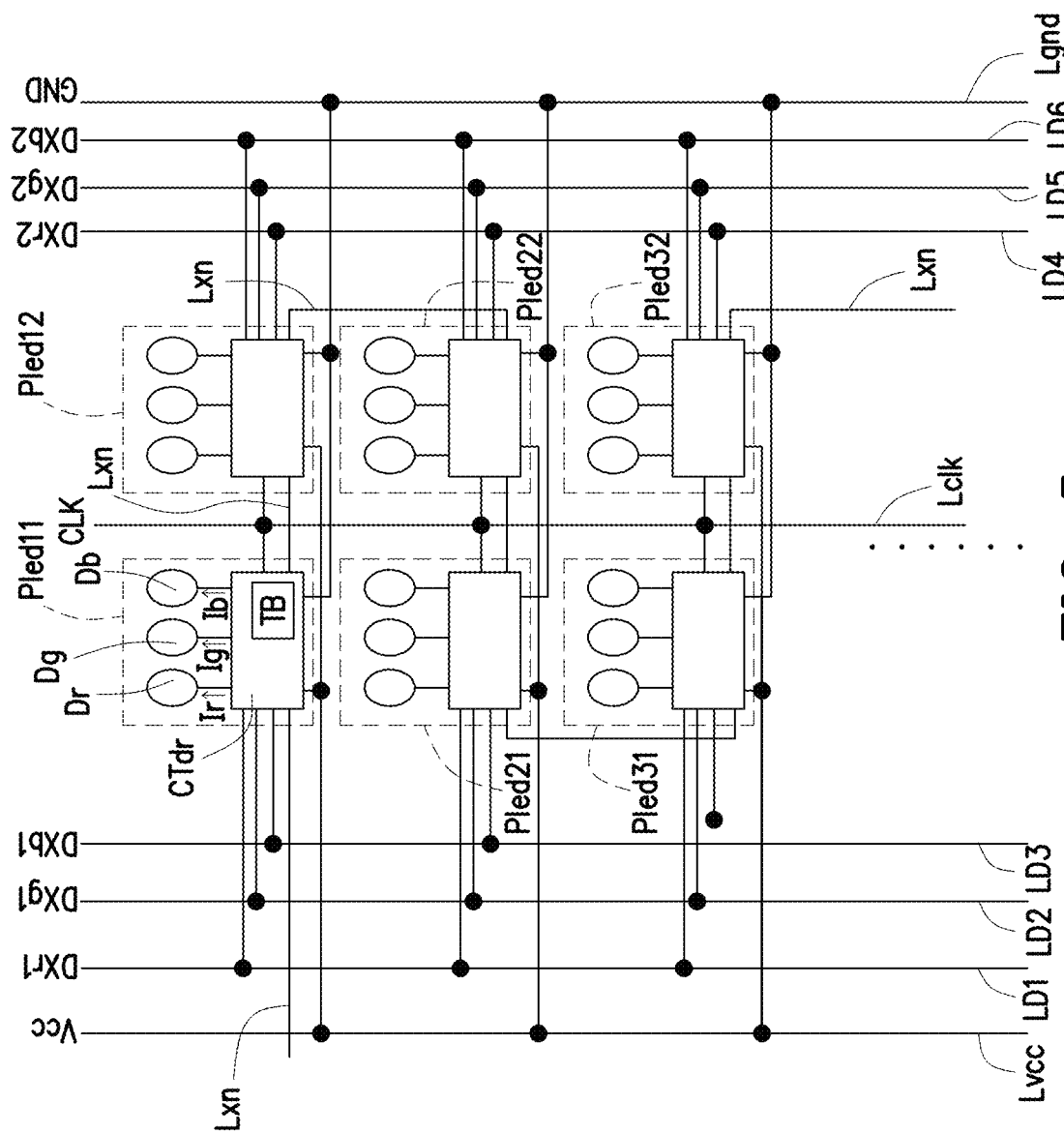
FIG. 3 is a schematic diagram of a circuit configuration of a pixel circuit according to an embodiment of the disclosure.
Figure 4:
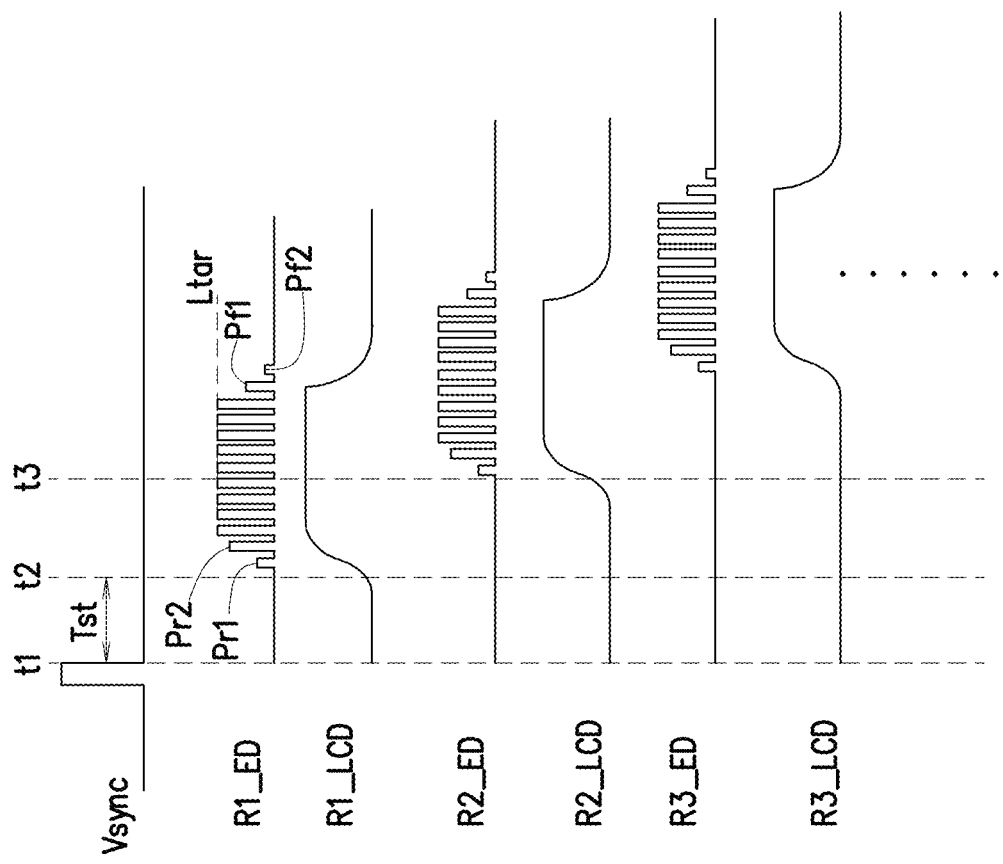
FIG. 4 is a schematic diagram of a driving waveform of a pixel circuit according to an embodiment of the disclosure.

Each of the self-luminous pixel circuits Pled receives multiple display data (DXr1, DXg1, DXb1, DXr2, DXg2, and DXb2 as shown in FIG. 3) to determine a pulse wave gradient method of a driving current (Ir, Ig, and Ib as shown in FIG. 3) for driving a corresponding one of the red light-emitting diode Dr, the green light-emitting diode Dg, and the blue light-emitting diode Db based on multiple gradient bits (here, 4 bits a0 to a3 are taken as an example) of one of the received display data, and determine a target current level (a target current level Ltar as shown in FIG. 4) for climbing of multiple current pulse waves of the driving current (the driving currents Ir, Ig, and Ib as shown in FIG. 3) based on multiple gray-scale current bits (here, 8 bits a4 to all are taken as an example) of the one of the received display data.

According to the above, since the current pulse waves of the driving current of the corresponding one of the red light-emitting diode Dr, the green light-emitting diode Dg, and the blue light-emitting diode Db gradually rise and then gradually fall by the gradient method, compared with a traditional pulse wave driving method, light-emitting methods (that is, brightness curves) of the red light-emitting diode Dr, the green light-emitting diode Dg, and the blue light-emitting diode Db may approach brightness curves of the liquid crystal pixel circuits Plcd. In this way, the liquid crystal pixel circuit Pled and the self-luminous pixel circuit Pled may be as similar as possible in terms of light pattern performance, chromaticity, brightness, and behavior, thereby achieving an extremely narrow bezel or even bezel-less and a seamless viewing experience.

In the embodiment, the self-luminous pixel circuits Pled are divided into two or more groups (here, a group GP1 on the left and a group GP2 on the right are taken as an example) according to configuration positions, and the self-luminous pixel circuits Pled in each of the groups (for example, GP1 and GP2) are coupled in series.

In the embodiment, each of the self-luminous pixel circuits Pled includes at least one red light-emitting diode Dr, at least one green light-emitting diode Dg, at least one blue light-emitting diode Db, and a driving circuit CTdr. In addition to the self-luminous pixel circuits Pled at two ends, in each of the self-luminous pixel circuits Pled, the driving circuit CTdr is coupled to the driving circuit CTdr of the previous self-luminous pixel circuit Pled and the driving circuit CTdr of the next self-luminous pixel circuit Pled, and the driving circuit CTdr receives the display data (for example, DXr1, DXg1, DXb1, DXr2, DXg2, and DXb2) matching the number of the coupled light-emitting elements and provides the driving currents matching the number of the coupled light-emitting elements to the coupled light-emitting elements (for example, the red light-emitting diode Dr, the green light-emitting diode Dg, and the blue light-emitting diode Db) to drive the coupled light-emitting elements (for example, the red light-emitting diode Dr, the green light-emitting diode Dg, and the blue light-emitting diode Db).

In the embodiment, the gradient bits take 4 bits a0 to a3 as an example. Therefore, the bits a0 to a3 may be roughly divided into 16 gradient methods. Taking 256 gray-scales as an example, the 256 gray-scales may be mapped to the 16 gradient methods by even distribution or adopting a method with a smaller error.

In the embodiment of the disclosure, the self-luminous pixel circuit Pled receives the display data via a serial peripheral interface (SPI) or the self-luminous pixel circuit Pled receives the display data via a quad serial peripheral interface (QSPI), which may be decided according to a screen refresh rate and layout costs, and the embodiment of the disclosure is not limited thereto.

FIG. 3 is a schematic diagram of a circuit configuration of a pixel circuit according to an embodiment of the disclosure. Please refer to FIG. 1 to FIG. 3. In the embodiment, a part of the bezel display area Rbez is shown, and multiple traces may be configured on the display panel 100 to transmit signals/voltages/data to the self-luminous pixel circuits (here, a 3*2 array of self-luminous pixel circuits Pled11 to Pled32 are taken as an example). In the embodiment, the display panel 100 may be provided with a power line Lvcc, data lines LD1 to LD6, a clock signal line Lclk, a ground line Lgnd, and multiple serial signal lines Lxn.

The power line Lvcc receives a system high voltage Vcc and is coupled to the driving circuits CTdr in the self-luminous pixel circuits Pled11 to Pled32 to transmit the system high voltage Vcc to the driving circuits CTdr in the self-luminous pixel circuits Pled11 to Pled32.

The data line LD1 receives the display data DXr1 corresponding to red and is coupled to the driving circuits CTdr in the self-luminous pixel circuits Pled11, Pled21, and Pled32 to transmit the display data DXr1 to the driving circuits CTdr in the self-luminous pixel circuits Pled11, Pled21, and Pled32, wherein the driving circuits CTdr in the self-luminous pixel circuits Pled11, Pled21, and Pled32 provide the driving current Ir to the individually coupled red light-emitting diode Dr according to the received display data DXr1.

The data line LD2 receives the display data DXg1 corresponding to green and is coupled to the driving circuits CTdr in the self-luminous pixel circuits Pled11, Pled21, and Pled32 to transmit the display data DXg1 to the driving circuits CTdr in the self-luminous pixel circuits Pled11, Pled21, and Pled32, wherein the driving circuits CTdr in the self-luminous pixel circuits Pled11, Pled21, and Pled32 provide the driving current Ig to the individually coupled green light-emitting diode Dg according to the received display data DXg1.

The data line LD3 receives the display data DXb1 corresponding to blue and is coupled to the driving circuits CTdr in the self-luminous pixel circuits Pled11, Pled21, and Pled32 to transmit the display data DXb1 to the driving circuits CTdr in the self-luminous pixel circuits Pled11, Pled21, and Pled32, wherein the driving circuits CTdr in the self-luminous pixel circuits Pled11, Pled21, and Pled32 provide the driving current Ig to the individually coupled blue light-emitting diode Db according to the received display data DXb1.

The clock signal line Lelk receives a clock signal CLK and is coupled to the driving circuits CTdr in the self-luminous pixel circuits Pled11 to Pled32 to transmit the clock signal CLK to the driving circuits CTdr in the self-luminous pixel circuits Pled11 to Pled32.

The data line LD4 receives the display data DXr2 corresponding to red and is coupled to the driving circuits CTdr in the self-luminous pixel circuits Pled12, Pled22, and Pled32 to transmit the display data DXr2 to the driving circuits CTdr in the self-luminous pixel circuits Pled12, Pled22, and Pled32, wherein the driving circuits CTdr in the self-luminous pixel circuits Pled12, Pled22, and Pled32 provide the driving current Ir to the individually coupled red light-emitting diode Dr according to the received display data DXr2.

The data line LD5 receives the display data DXg2 corresponding to green and is coupled to the driving circuits CTdr in the self-luminous pixel circuits Pled12, Pled22, and Pled32 to transmit the display data DXg2 to the driving circuits CTdr in the self-luminous pixel circuits Pled12, Pled22, and Pled32, wherein the driving circuits CTdr in the self-luminous pixel circuits Pled12, Pled22, and Pled32 provide the driving current Ig to the individually coupled green light-emitting diode Dg according to the received display data DXg2.

The data line LD6 receives the display data DXb2 corresponding to blue and is coupled to the driving circuits CTdr in the self-luminous pixel circuits Pled12, Pled22, and Pled32 to transmit the display data DXb2 to the driving circuits CTdr in the self-luminous pixel circuits Pled12, Pled22, and Pled32, wherein the driving circuits CTdr in the self-luminous pixel circuits Pled12, Pled22, and Pled32 provide the driving current Ig to the individually coupled blue light-emitting diode Db according to the received display data DXb2.

The ground line Lgnd receives a ground voltage GND and is coupled to the driving circuits CTdr in the self-luminous pixel circuits Pled11 to Pled32 to transmit the ground voltage GND to the driving circuits CTdr in the self-luminous pixel circuits Pled11 to Pled32.

The serial signal line Lxn is coupled between the self-luminous pixel circuits Pled11 to Pled32, so that the self-luminous pixel circuits Pled11 to Pled32 are coupled in series, and the self-luminous pixel circuits Pled11 to Pled32 may transmit received commands/parameters one by one to initialize the self-luminous pixel circuits Pled11 to Pled32.

In the embodiment, the driving circuit CTdr may have a lookup table TB to determine the pulse wave gradient method corresponding to the gradient bits (for example, a0 to a3) via the lookup table TB.

FIG. 4 is a schematic diagram of a driving waveform of a pixel circuit according to an embodiment of the disclosure. Please refer to FIG. 1 to FIG. 4. In the embodiment, waveforms R1_ED to R3_ED show current pulse waves of the driving currents (for example, Ir, Ig, and Ib) of three consecutive columns (for example, the 1st column to the 3rd column), and waveforms R1_LCD to R3_LCD show light field changes of the liquid crystal pixel circuit Pled of three consecutive columns (for example, the 1st column to the 3rd column).

As shown in FIG. 4, the pulse wave gradient method of each driving current (for example, Ir, Ig, and Ib) determines multiple climbing current levels of multiple climbing current pulse waves Pr1 and Pr2 gradually rising before the current pulse waves on the driving current (for example, Ir, Ig, and Ib) climb to the target current level Ltar. Moreover, the pulse wave gradient method of each driving current (for example, Ir, Ig, and Ib) also determines multiple falling current levels of multiple falling current pulse waves Pf1 and Pf2 gradually falling after the current pulse waves on the driving current (for example, Ir, Ig, and Ib) climb to the target current level Ltar. Therefore, the pulse wave gradient method of each light-emitting element (for example, the red light-emitting diode Dr, the green light-emitting diode Dg, and the blue light-emitting diode Db) corresponds to a brightness change in a gray-scale value reflected by each of the liquid crystal pixel circuits Pled displaying the gray-scale current bits a4 to a11. In other words, when the self-luminous pixel circuit Pled and the liquid crystal pixel circuit Plcd display the same gray-scale value, changes in presented light fields are similar.

Generally speaking, after receiving a vertical synchronization signal Vsync (that is, a time t1 when the vertical synchronization signal Vsync forms an enable pulse wave), transmission of the display data (for example, DXr1, DXg1, DXb1, DXr2, DXg2, and DXb2) must be completed before the light-emitting pixel circuit Pled and the liquid crystal pixel circuit Plcd of the first column perform display (that is, a time t2), that is, the transmission of data must be completed within a time segment Tst. A time t3 is a time when the light-emitting pixel circuit Pled and the liquid crystal pixel circuit Pled of the second column perform display.

A relationship between a correlation coefficient of the self-luminous pixel circuit Pled and the time segment Tst is as follows:

$$\frac{1}{ic\_sample\_clock} \times ic\_number \times ic\_channel \times data\_bit + Mcu \leq Tst$$

where ic_sample_clock is a clock frequency (Hz) of the driving circuit Ctdr performing sampling, ic_number is the number of the driving circuits Ctdr for controlling the bezel display area Rbez (that is, the number of the self-luminous pixel circuits Pled), ic_channel is the number of channels controlled by the driving circuit Ctdr (that is, the number of controlled light-emitting elements), data_bit is the number of bits of a single display data (for example, DXr1, DXg1, DXb1, DXr2, DXg2, and DXb2) received by the driving circuit Ctdr during one screen period, and Mcu is a time required for the driving circuit Ctdr to process data.

For example, assuming that the time length of the time segment Tst is about 4 milliseconds (ms), ic_number is 8152, ic_channel is 3 (that is, one red light-emitting diode Dr, one green light-emitting diode Dg, and one blue light-emitting diode Db are controlled), data_bit is 12, and Mcu is 1 ms, then the transmission time of each bit is about 10 nanoseconds (ns), that is, ic_sample_clk is about 100 Mhz.

In the embodiment of the disclosure, in order to achieve a target number of transmission bits (that is, to complete the transmission of all the display data), the frequency of the clock signal CLK may be high and unstable. Therefore, data output lines may be added to reduce the frequency of the clock signal CLK.

According to the above, in the embodiment of the disclosure, the self-luminous pixel circuit Pled uses the driving circuit CTdr to actively control the red light-emitting diode Dr, the green light-emitting diode Dg, and the blue light-emitting diode Db. Each driving circuit CTdr may control 3 to 6 channels and may control 3 to 6 light-emitting elements (the red light-emitting diode Dr/the green light-emitting diode Dg/the blue light-emitting diode Db), which is equivalent to controlling 1 to 2 pixels.

In the embodiment of the disclosure, each driving circuit CTdr has multiple channels, wherein at least one channel is used to receive the clock signal CLK, multiple channels are used to connect one of a positive terminal and a negative terminal of the red light-emitting diode Dr, and the other one of the positive terminal and the negative terminal of the red light-emitting diode Dr, the green light-emitting diode Dg, and the blue light-emitting diode Db receives a corresponding one of the system high voltage Vcc and the ground voltage GND, at least one channel is used to receive the system high voltage Vcc, at least one channel is used to receive the ground voltage GND, multiple channels are used to receive the display data (for example, DXr1, DXg1, DXb1, DXr2, DXg2, and DXb2), at least one channel is coupled to the driving circuit CTdr of the previous self-luminous pixel circuit Pled, and at least one channel is coupled to the driving circuit CTdr of the next self-luminous pixel circuit Pled.

In the embodiment of the disclosure, the driving circuit CTdr controls an output timing of each row outputting data to the self-luminous pixel circuit Pled to be consistent with a scanning timing of scan lines of the main display area Rmain coupled to the liquid crystal pixel circuit Plcd.

In the embodiment of the disclosure, an initial emission waveform of the self-luminous pixel circuit Pled is a pulse width modulation (PWM) signal, an initial emission method may be recorded in the first few bits (for example, 4 bits) among multiple bits (for example, 12 bits) of the display data (DXr1, DXg1, DXb1, DXr2, DXg2, and DXb2 as shown in FIG. 3), and the remaining bits (for example, the last 12 bits) are gray-scale current bits (that is, gray-scale signals) to control level of gray-scale brightness through controlling duty. Assuming that different climbing waveforms are stored in the 4 bits, 16 sets of the initial emission waveforms that simulate the liquid crystal pixel circuit Plcd may be stored.

In the embodiment of the disclosure, taking the full high definition (FHD) resolution as an example, assuming that 20 Mhz is the frequency of the clock signal CLK (that is, the scanning speed of the self-luminous pixel circuit Pled), transmission is performed with 4 line outputs, the reception time may be within 3 ms, and the calculation time of the driving circuit CTdr is about 1 ms, then emission of the waveform corresponding to the climbing time of the liquid crystal pixel circuit Plcd may be initiated.

In the embodiment of the disclosure, each driving circuit CTdr stores an initial emission waveform setting combination corresponding to the gradient bits (for example, 4 or more bits), a lookup table during setting sent by the display data (DXr1, DXg1, DXb1, DXr2, DXg2, and DXb2 as shown in FIG. 3) is read, and a corresponding initial emission setting is given.

In summary, in the display panel of the embodiment of the disclosure, since the current pulse waves of the driving current of the light-emitting element are set by the gradient method, compared with the traditional pulse wave driving method, the light-emitting method (that is, the brightness curve) of the light-emitting element may approach the brightness curve of the liquid crystal pixel circuit. In this way, the liquid crystal pixel circuit and the self-luminous pixel circuit may be as similar as possible in terms of light pattern performance, chromaticity, brightness, and behavior, thereby achieving the extremely narrow bezel or even bezel-less and the seamless viewing experience.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A display panel, comprising:
    a plurality of liquid crystal pixel circuits, disposed in a main display area of the display panel; and
    a plurality of self-luminous pixel circuits, each having a plurality of light-emitting elements disposed in a bezel display area surrounding the main display area in the display panel,
    wherein each of the light-emitting pixel circuits receives a plurality of display data, determines a pulse wave gradient method of a driving current for driving a corresponding one of the light-emitting elements based on a plurality of gradient bits of one of the display data, and determines a target current level for climbing of a plurality of current pulse waves of the driving current based on a plurality of gray-scale current bits of the one of the display data.

2. The display panel according to claim 1, wherein the self-luminous pixel circuits are divided into two or more groups according to configuration positions, and the self-luminous pixel circuits in each of the groups are coupled in series.

3. The display panel according to claim 2, wherein each of the light-emitting pixel circuits comprises:
    at least one red light-emitting diode, at least one green light-emitting diode, and at least one blue light-emitting diode; and
    a driving circuit, coupled to the driving circuit of a previous light-emitting pixel circuit and the driving circuit of a next light-emitting pixel circuit, receives the display data and provides the driving currents to the at least one red light-emitting diode, the at least one green light-emitting diode, and the at least one blue light-emitting diode to drive the at least one red light-emitting diode, the at least one green light-emitting diode, and the at least one blue light-emitting diode.

4. The display panel according to claim 2, wherein the driving circuit has a lookup table to determine the pulse wave gradient method corresponding to the gradient bits via looking up the lookup table.

5. The display panel according to claim 2, wherein the pulse wave gradient method determines a plurality of climbing current levels of a plurality of climbing current pulse waves gradually rising before the current pulse waves climb to the target current level.

6. The display panel according to claim 2, wherein the pulse wave gradient method determines a plurality of falling current levels of a plurality of falling current pulse waves gradually falling after the current pulse waves climb to the target current level.

7. The display panel according to claim 2, wherein the light-emitting pixel circuits receive the display data via a serial peripheral interface (SPI).

8. The display panel according to claim 2, wherein the light-emitting pixel circuits receive the display data via a quad serial peripheral interface (QSPI).

9. The display panel according to claim 1, wherein the pulse wave gradient method of each of the light-emitting elements corresponds to a brightness change of a gray-scale value reflected by each of the liquid crystal pixel circuits displaying the gray-scale current bits.

* * * * *